UNITED STATES PATENT OFFICE 2,616,932

DIHYDROXYDIPHENYLMETHANES

Clarence L. Moyle, Clare, and Paul A. Wolf, Midland, Mich., assignors to The Dow Chemical Company, Midland, Mich., a corporation of Delaware No Drawing. Application June 26, 1951,
Serial No. 233,703

5 Claims. (Cl. 260—619)

This invention is directed to dihydroxydiphenylmethanes characterized by the formula:

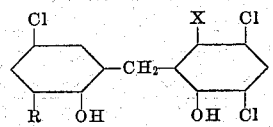

In this and succeeding formulae, R represents a benzyl, chlorobenzyl or cyclohexyl radical and X represents chlorine or hydrogen.

These new compounds are crystalline solids, somewhat soluble in many organic solvents and substantially insoluble in water. They have been found to exert a strong antimicrobial action against bacteria and fungi and may be employed as an antimicrobial constituent of soaps, detergent compositions, plastics, rubber goods, cosmetics, surgical dressings, dentifrices, ointments and creams to render such materials germicidal.

Several methods may be employed for the preparation of the new compounds. One such procedure includes reacting in the presence of an acid condensing agent, such as sulfuric acid, 1 molecular proportion of a 2-substituted 4-chlorophenol of the formula:

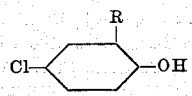

and 1 molecular proportion of 2,4-dichlorophenol or 2,4,5-trichlorophenol with 1 molecular proportion of formaldehyde or formaldehyde yielding substance. When a formaldehyde-yielding substance is employed as a reactant, the amount of such material is equivalent to the amount of formaldehyde desired in the reaction. The amount of sulfuric acid condensing agent to be employed varies over a wide range. Good yields have been obtained when employing about 16 moles of sulfuric acid per mole of formaldehyde in the mixture. In practice, it is often found advantageous to carry out the reaction in a mixture of sulfuric acid and acetic acid as condensing agent.

In carrying out the reaction, the 2-substituted 4-chlorophenol, the 2,4-dichlorophenol or 2,4,5-trichlorophenol, formaldehyde or formaldehyde-yielding substance and acetic acid, if employed, are mixed together and the resulting mixture added portionwise over a short period of time to the sulfuric acid. The condensation begins immediately with production of the desired diphenol compound and water of reaction. The addition is carried out at a temperature of from 0° to 50° C., and the temperature of the reaction mixture thereafter raised to from 50° to 90° C. for a period of time to complete the reaction. The condensation is somewhat exothermic and stirring and cooling are generally required to prevent over-heating. Upon completion of the reaction, the desired product is separated by conventional means, such as washing with water and recrystallization from various organic solvents.

A preferred procedure for preparing the new compounds comprises reacting in the presence of an acid condensing agent, such as sulfuric acid, at least one molecular proportion of the aforesaid substituted chlorophenol with one molecular proportion of 3,5-dichlorosaligenin or 3,5,6-trichlorosaligenin. In practice, good results have been obtained when employing from about 5 to 20 moles of sulfuric acid per mole of the substituted chlorophenol.

In carrying out the reaction, the substituted chlorophenol and 3,5-dichlorosaligenin or 3,5,6-trichlorosaligenin are dispersed in aqueous 70–80 percent sulfuric acid with stirring, and the temperature of the resulting mixture raised to from 75° to 130° C. for a period of time to complete the reaction. The condensation begins immediately with the production of the desired product and water of reaction. Upon completion of the reaction, the desired product may be separated, as previously described.

In an alternative procedure, the substituted chlorophenol may be dispersed in the sulfuric acid and the saligenin compound added portionwise thereto with stirring. The addition is generally carried out at a temperature of from 20° to 75° C. and the temperature of the reaction mixture thereafter raised to from 70° to 130° C. for a period of time to complete the reaction.

The 3,5-dichlorosaligenin and 3,5,6-trichlorosaligenin employed as starting materials, as above described, are crystalline solids substantially insoluble in water, soluble in aqueous alkalis and somewhat soluble in many organic solvents. They may be prepared by reacting one molecular proportion of an alkali metal salt of 2,4-dichlorophenol or 2,4,5-trichlorophenol with at least one molecular proportion of formaldehyde. Of the alkali metal salts found useful in the reaction, it is preferred to employ the sodium compound. In carrying out the reaction, one mole of 2,4-dichlorophenol or 2,4,5-trichlorophenol is dissolved with stirring in an aqueous solution containing 1 mole of sodium hydroxide to prepare an aqueous solution of the corresponding phenolate. At least one mole of formaldehyde is then added portionwise to the above mixture with stirring. This addition is carried out at a temperature of from 20° to 60° C. and the resulting mixture thereafter maintained at a temperature of from 40° to 80° C. for a period of time to complete the reaction. Following the reaction, the reaction mixture is acidified with an acid such as acetic acid or hydrochloric acid. The desired product is then separated in the usual manner, such as by washing with water, decantation and recrystallization.

The following examples serve to illustrate the invention but should not be construed as limiting the same.

EXAMPLE 1

*3-cyclohexyl-2,2'-dihydroxy-3',5,5',6'-tetra-chlorodiphenylmethane*

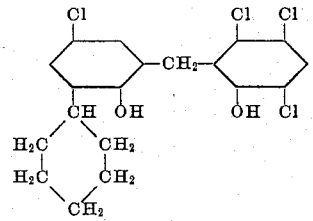

21.05 grams (0.1 mole) of 2-cyclohexyl-4-chlorophenol (having a freezing point of 57.1° C.), 19.8 grams (0.1 mole) of 2,4,5-trichlorophenol, 3.4 grams of paraformaldehyde (equivalent to 0.113 mole of HCHO), and 20 grams of glacial acetic acid were mixed together and the resulting dispersion added portionwise to a mixture of 160 grams of aqueous 96 percent sulfuric acid and 40 grams of glacial acetic acid. The addition was carried out over a period of 5 minutes and at a temperature of from 3° to 15° C. Stirring was then continued over a period of 2 hours as the temperature of the reaction mixture was gradually raised to 91° C. to complete the reaction. The vessel and contents were then cooled to room temperature, the reaction mixture separating into a liquid acid layer and a sticky amorphous mass. The latter was separated, washed with water, dissolved in a solution of sodium hydroxide in aqueous isopropyl alcohol, and the resulting mixture filtered. The filtrate was then poured into 200 milliliters of 20 percent aqueous hydrochloric acid, the resulting mixture separating into an aqueous acid layer and a sticky brown solid. The latter was separated and successively recrystallized from carbon tetrachloride and a petroleum distillate boiling from 100° to 140° C. (Skellysolve) to obtain a 3-cyclohexyl-2,2'-dihydroxy - 3',5,5',6' - tetrachlorodiphenylmethane product as a crystalline solid melting at 150.5° C. to 151.5° C. A portion of the latter material was thereafter recrystallized from Skellysolve to obtain a product melting at 151.8° C.

EXAMPLE 2

*3-cyclohexyl-2,2'-dihydroxy-3',5,5',6'-tetra-chlorodiphenylmethane*

9.2 grams (0.0438 mole) of 2-cyclohexyl-4-chlorophenol was dispersed in 100 grams of aqueous 75 percent sulfuric acid and 9.96 grams (0.0438 mole) of 3,5,6-trichlorosaligenin (melting at 121.5° to 122° C.) added portionwise thereto with stirring. The addition was carried out over a period of 15 minutes and at a temperature of from 66° to 72° C. Stirring was thereafter continued and the temperature of the reaction mixture gradually raised over a period of 2.3 hours to 97° C. The reaction vessel and content were then cooled to room temperature; the mixture separating into a liquid acid layer and a brown amorphous mass. The latter was separated, washed with water, and thereafter dispersed in 100 milliliters of water warmed to a temperature of from 90° to 95° C. The hot aqueous dispersion was then treated with a small amount of dilute aqueous sodium hydroxide to neutralize the sulfuric acid. The brown amorphous mass of the latter mixture was then separated, washed with water, and dissolved in a petroleum distillate (Skellysolve, boiling from 100° to 140° C.), warmed to a temperature of 82° C. and the resulting solution dried with sodium sulfate. Upon being cooled to 5° C., this solution separated into a liquid layer and a peach-colored crystalline solid. The latter was separated and twice recrystallized from carbon tetrachloride and thereafter from Skellysolve to obtain a 3-cyclohexyl-2,2'-dihydroxy - 3',5,5',6' - tetrachlorodiphenylmethane product melting at 152.6° C.

EXAMPLE 3

*3-cyclohexyl-2,2'-dihydroxy-3',5,5'-trichloro-diphenylmethane*

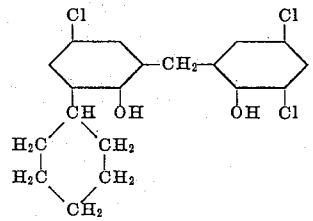

21.05 grams (0.1 mole) of 4-chloro-2-cyclohexylphenol (having a freezing point of 57.1–58.5° C.) and 19.3 grams (0.1 mole) of a 3,5-dichlorosaligenin product (having a melting point of 78.5° C.) were dispersed in 100 grams of aqueous 80 percent sulfuric acid with stirring, and the resulting mixture warmed to a temperature of 70° C. Heating and stirring were thereafter continued and the temperature of the reaction mixture gradually raised over a period of 35 minutes to 130° C. to complete the reaction. The reaction vessel and contents were then cooled to room temperature, the mixture separating into an acid liquid layer and a sticky amorphous mass. The latter was separated, washed with water and dissolved at 70° C. in a mixture of equal parts by weight of methanol and water which was made alkaline with aqueous 20 percent sodium hydroxide. This solution of the product was then acidified with aqueous hydrochloric acid and cooled to room temperature, the resulting mixture separating into an acid liquid layer and a sticky brown mass. The latter was separated and successively recrystallized from a petroleum hydrocarbon distillate having a boiling range of from 80° to 100° C. (80°–100° Skellysolve), xylene, a mixture of equal parts by weight of xylene and isopropanol, and tetrachloroethylene to obtain a 3-cyclohexyl-2,2'-dihydroxy - 3',5,5'-trichlorodiphenylmethane product. The latter was a white, crystalline solid, melting at 176–176.5° C. and containing 27.46 percent by weight of chlorine as compared to a chlorine content of 27.67 percent calculated for $C_{19}H_{19}O_2Cl_3$.

EXAMPLE 4

*3(4 - chlorobenzyl)-2,2'-dihydroxy-3',5,5',6'-tetrachlorodiphenylmethane*

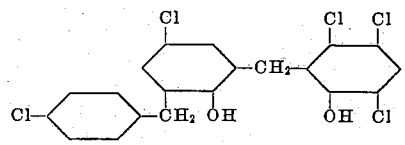

10 grams (0.0395 mole) of 4-chloro-2(4-chlorobenzyl) phenol (freezing at 44° C.) and 8.8 grams (0.0395 mole) of 3,5,6-trichlorosaligenin were mixed together and thereafter added portionwise to 106 grams of aqueous 75 percent sulfuric acid. The addition was carried out with stirring and at a temperature of from 30° to 45° C. Stirring was continued and the temperature of the reaction mixture gradually raised over a period of 5.5 hours to 102° C. to complete the reaction. The reaction vessel and contents were cooled to room temperature, the mixture separating into an acid layer and a brown, brittle solid. The latter was separated, washed with water and with hot, dilute, aqueous ammonium hydroxide solution. The washed solid was successively recrystallized from a mixture of 60 parts by weight of carbon tetrachloride to 20 parts by weight of toluene, from tetrachloroethylene followed by a carbon tetrachloride wash and finally from chlorobenzene to separate a 3 (4 - chlorobenzyl) - 2,2' - dihydroxy - 3',5,5',6'-tetrachlorodiphenylmethane product. The latter is a pink, crystalline solid, melting at 156° to 157° C. and having a chlorine content of 38.35 percent, as compared with a theoretical chlorine content of 38.38 percent calculated for $C_{20}H_{13}Cl_5O_2$.

EXAMPLE 5

3 - benzyl-2,2'-dihydroxy-3',5,5'-trichlorodiphenylmethane

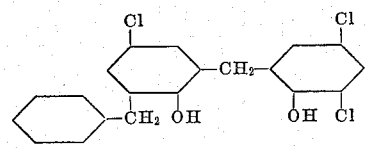

21.85 grams (0.1 mole) of 2-benzyl-4-chlorophenol (melting at 49° C.) and 19.3 grams (0.1 mole) of 3,5-dichlorosaligenin were dispersed in 100 grams of aqueous 80 percent sulfuric acid and the resulting mixture warmed to a temperature of 50° C. Heating was thereafter continued over a period of three hours at temperatures gradually increasing up to a temperature of 115° C. to complete the reaction. The crude reaction product was separated from the supernatent acid layer and dissolved at the boiling temperature in an aqueous solution containing 42.5 percent by weight of methanol and 7 percent by weight of sodium hydroxide. The resulting solution of the product was then acidified with aqueous hydrochloric acid and cooled to room temperature, the mixture separating into an acid liquid layer and a sticky brown mass. The latter was separated and successively recrystallized from carbon tetrachloride, toluene and tetrachloroethylene to obtain a 3 - benzyl - 2,2' - dihydroxy-3',5,5'-trichlorodiphenylmethane product as a crystalline solid, melting at 146–147.5° C.

EXAMPLE 6

3 - benzyl-2,2'-dihydroxy-3',5,5',6'-tetrachlorodiphenylmethane

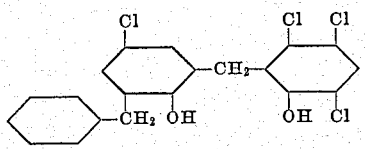

0.1 mole of 2-benzyl-4-chlorophenol is dispersed with stirring in 100 grams of aqueous 80 percent sulfuric acid. To the resultant mixture 0.1 mole of 3,5,6-trichlorosaligenin is added portionwise. Stirring is continued and heat applied gradually over a period of three hours to raise the temperature of the mixture to 115° C. to complete the reaction. The crude reaction product is separated and worked up in a fashion similar to the procedure in Example 4, to obtain a 3-benzyl - 2,2' - dihydroxy-3',5,5',6'-tetrachlorodiphenylmethane product as a crystalline solid.

It has been discovered that the compounds of this invention are particularly valuable as constituents of toilet, washing and so-called liquid soaps. When any one of these compounds is incorporated in soap compositions, it retains its germicidal effectiveness against a number of bacterial organisms. In preparing such soap compositions, the diphenol product may be added directly to the detergent soap during the crutching, milling or similar operation. Another mode of operation comprises dissolving the germicidal diphenol in a suitable solvent, such as alcohol or acetone, and dispersing the resulting solution in the detergent soap. In general, any method which results in the germicidal agent being uniformly distributed in the final soap product is satisfactory. Suitable concentrations of the germicide in the new soap compositions are in the order of from 1 to 3 percent by weight of the soap.

Aqueous soap compositions, containing representative compounds of the present invention, were tested for the control of Staphylococcus aureus. In such operations, 100 percent kills of the test organism were obtained in from 2 to 3 minutes with concentrations of the diphenol agents of 1 part in 5,000 to 1 part in 9,000.

This application is a continuation-in-part of our copending application, Serial No. 158,601, filed April 27, 1950, now abandoned.

We claim:

1. A compound of the formula:

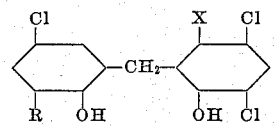

wherein R is a member of the group consisting of cyclohexyl, benzyl and chlorobenzyl radicals, and X is a member of the group consisting of chlorine and hydrogen.

2. 3 - cyclohexyl-2,2'-dihydroxy-3',5,5',6'-tetrachlorodiphenylmethane.

3. 3-cyclohexyl - 2,2' - dihydroxy-3',5,5'-trichlorodiphenylmethane.

4. 3-benzyl - 2,2' - dihydroxy-3',5,5'-trichlorodiphenylmethane.

5. 3 - ( 4 - chlorobenzyl ) - 2,2' - dihydroxy - 3',5,5',6'-tetrachlorodiphenylmethane.

CLARENCE L. MOYLE.
PAUL A. WOLF.

REFERENCES CITED

The following references are of record in the file of this patent:

Florestano, J. Pharmacol. Exptl. Therapy, vol. 96, pp. 238–49 (1949) (12 pages).